United States Patent
Yin et al.

(10) Patent No.: US 8,621,651 B2
(45) Date of Patent: Dec. 31, 2013

(54) ENFORCING CONTENT BLACKOUT

(75) Inventors: Fenglin Yin, Lexington, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/355,871

(22) Filed: Jan. 23, 2012

(65) Prior Publication Data

US 2013/0191928 A1 Jul. 25, 2013

(51) Int. Cl.
*G06F 12/14* (2006.01)
*H04N 5/775* (2006.01)
*H04N 7/16* (2011.01)

(52) U.S. Cl.
USPC .............................. 726/27; 386/230; 725/25

(58) Field of Classification Search
USPC .............................. 726/27; 386/230; 725/25
See application file for complete search history.

(56) References Cited

U.S. PATENT DOCUMENTS

| | | | |
|---|---|---|---|
| 2005/0071669 A1* | 3/2005 | Medvinsky et al. | 713/200 |
| 2007/0076872 A1* | 4/2007 | Juneau | 380/202 |
| 2007/0259715 A1* | 11/2007 | McNutt et al. | 463/29 |
| 2007/0291944 A1* | 12/2007 | Wingert et al. | 380/258 |
| 2008/0168487 A1* | 7/2008 | Chow et al. | 725/31 |
| 2010/0124399 A1* | 5/2010 | Sofos et al. | 386/46 |
| 2010/0125866 A1* | 5/2010 | Sofos et al. | 725/25 |
| 2010/0125867 A1* | 5/2010 | Sofos et al. | 725/28 |
| 2012/0155639 A1* | 6/2012 | Oney et al. | 380/236 |

* cited by examiner

*Primary Examiner* — Techane Gergiso

(57) ABSTRACT

A system includes a network interface, a memory, and a processor. The network interface is configured to communicate, over a network, with a user device associated with a user. The memory is configured to store instructions to be executed by the processor. The processor is configured to execute the instructions to: receive, from the user device via the one or more network interfaces, a request for content; initiate an upload of the requested content to the user device in response to the request; receive a request for a license key from the user device in response to the initiation of the upload; determine whether the user device is outside a blackout region associated with the content; generate a license key when the one or more processors determine that the user device is outside the blackout region; and send the license key to the user device.

20 Claims, 11 Drawing Sheets

ENFORCING CONTENT BLACKOUT

BACKGROUND

Multi-screen video architecture generally provides cross-platform access to a single content source. Among other benefits, multi-screen video provides consumers the possibility to watch video on a screen/device of their choice. For example, a live broadcast television event may also be available for viewing on various types of mobile devices.

DETAILED DESCRIPTION OF PREFERRED EMBODIMENTS

The following detailed description refers to the accompanying drawings. The same reference numbers in different drawings may identify the same or similar elements. As used herein, the term "blackout content" may refer to particular content with a restriction(s) in using, playing, or viewing the content under a purchase agreement, subscription agreement, license agreement, contractual agreement, governmental laws, regulatory agency regulations (e.g., censorship regulations), etc. The restrictions may apply with respect to geographical locations/areas/regions and with respect to time. As used herein, the term "blackout region" of blackout content may refer to a region or an area in which the content may not be viewed or played by a user or a user device. As used herein, the term "blackout times" of blackout content may refer to dates, days, and/or times during which the content may not be viewed or played by the user or the user device.

As described herein, a system enforces blackouts of content. To use the user device with the system, the user may download an application to the user device, after which the user may register the device at the system. During the registration, the system sends a unique device registration token to the user device. When the application requests user-selected content to be streamed from the system, the system ensures that the user device receiving the content has the registration token, a streaming/downloading right, a right to view the content at a particular level of quality, etc. In addition, the system and the application ensure that if the selected content is blackout content, the user device is permitted to play the content if the user device is outside of the blackout region(s) and blackout time(s) for the content.

Figure 1:
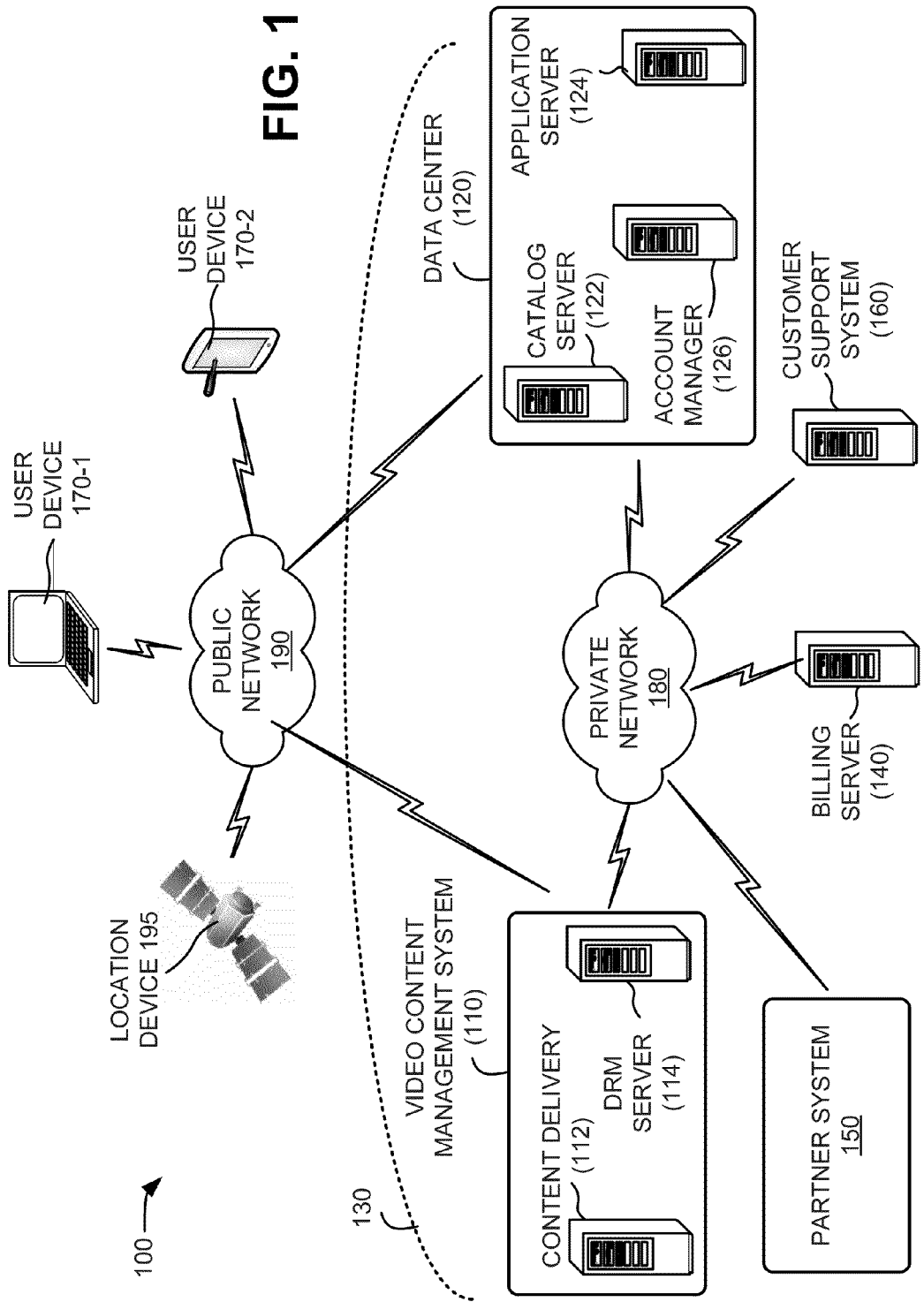
FIG. 1 is an exemplary network in which systems and/or methods described herein may be implemented.

FIG. 1 is an exemplary network 100 in which systems and/or methods described herein may be implemented. As illustrated, network 100 may include user devices 170-1 and 170-2 (collectively "user devices" and individually "user device 170"), public network 190, system 130, and location device(s) 195. As further shown, system 130 may include a video content management system (VCMS) 110, a data center 120, a billing server 140, a partner system 150, a customer support system 160, and a private network 180.

VCMS 110 may aggregate content and content metadata, process content, and distribute content. For example, VCMS 110 may receive, capture, and encrypt video streams of online live TV programs and tag each captured content with an identifier, channel identifier, program identifier, airing time, etc. In another example, VCMS 110 may transcode content into a digital format suitable for consumption on particular user devices 170. In some implementations, VCMS 110 may include a transcoder (hardware or software) to convert a video file from one format to another (e.g., from one bit rate to another bit rate, from one resolution to another, from one standard to another, from one file size to another, etc).

In one implementation, VCMS 110 may coordinate with other components of system 130 to enforce content blackout. VCMS 110 may control user device 170's access to content via other components in system 130, such as components in data center 120.

As further shown in FIG. 1, VCMS 110 may include a content delivery system 112 and a digital rights management (DRM) server 114. Content delivery system 112 may deliver digital content from a backend server to user devices 170 via, for example, a content delivery network (CDN). In one implementation, content delivery system 112 may include a server that provides streaming data (e.g., via a streaming universal resource locator (URL)) to user devices 170 (e.g., via public network 190). In one implementation, a streaming URL can be used only once for one user device 170 for security purposes.

DRM server 114 may issue, validate, and/or enforce DRM licenses to a client, such as an application running on one of user devices 170. In some implementations, DRM server 114 may determine entitlement rights and/or other authorization parameters via interfaces of data center 120. Such information may be used to authorize a user to access particular content (e.g., issue a license to user device 170), and enforce content blackout.

Data center 120 may manage user authentication, authorization for playing content, selection of content, and/or purchase of content by a user of user devices 170. As shown in FIG. 1, data center 120 may include a catalog server 122, an application server 124, and an account manager 126. In one implementation, data center 120 may be accessed by user devices 170 via public network 190.

Catalog server 122 may provide a unified catalog of both digital and physical content for users (e.g., of user devices 170) to consume (e.g., buy, rent, or subscribe). In one implementation, catalog server 122 may collect and/or present listings of content available to user devices 170. For example, catalog server 122 may receive digital and/or physical content metadata, such as lists or categories of content, from VCMS 110 and/or partner system 150. Catalog server 122 may use the content metadata to provide currently-available content options to user devices 170. Catalog server 122 may provide the content metadata to user device 170 directly or may communicate with user device 170 via application server 124.

Application server 124 may provide a backend support system for mobile applications residing on user devices 170. For example, application server 124 may authenticate (e.g., via account manager 126 and/or partner system 150) a user who desires to purchase, rent, or subscribe to digital or physical content. In another example, application server 124 may permit user device 170 to download a video application that enables a user to find content of interest or play downloaded or streaming content. In some implementations, the downloaded video application may participate in registration of user device 170 at VCMS 110 as well as in enforcing content blackout at user device 170.

Once user device 170 is registered at/via data center 120, the downloaded video application may enable user device 170 to present to a user of user device 170 information received from data center 120 in an interactive format, to allow selection of particular digital or physical content. Furthermore, the video application may coordinate with VCMS 110 and data center 120 in authorizing user device 170 to access the selected content.

Application server 124 may also provide content metadata, such as lists or categories of content, to user device 170. In one implementation, the interactions between application server 124 and user device 170 may be performed using hypertext transfer protocol (HTTP) or secure HTTP (HTTPS) via public network 190.

Account manager 126 may receive a login request associated with a user via another component in system 130 (e.g., application server 124, VCMS 110, etc.), and may initiate a login process. In one implementation, account manager 126 may participate in a federated/collaborative authentication process that involves partner system 150. Additionally, or alternatively, account manager 126 may request/receive device information (e.g., a registration token) associated with user device 170 via VCMS 110, and may compare the device information with stored information to validate/authenticate user device 170. Depending on the implementation, the stored information may reside in catalog server 122, account manager 126, etc.

Account manager 126 may also store or access, on behalf of another component (e.g., VCMS 110), information that is associated with enforcing blackouts of content at user device 170. The information may include, for example, blackout times, blackout regions, entitlement rights, a device tracking counter (to be described below), total viewing session counter, etc. The information may be stored in data center 120.

Account manager 126 may also store or retrieve profiles of users (e.g., users of user devices 170). The user profiles may include various information regarding a user. Application server 124 may use a user profile via account manager 126 and may update the user profile, via account manager 126, based on the user's activity (e.g., with a user's express permission).

In some implementations, a user profile in account manager 126 may include information used to determine user entitlements, which in turn are used to issue a license key for user-selected content. For example, a profile may include a device registration token, the maximum number of viewing sessions for the user, the maximum number of total viewing sessions for the user, video quality right, user device identifiers (e.g., a media player identifier, a mobile device identifier, a set top box identifier, a personal computer identifier) for user devices 170 associated with the user.

Billing server 140 may manage charging users for services provided via system 130. Billing server 140 may include, for example, a payment processing component, a billing component, and/or a settlement component.

Partner system 150 may coordinate with other components of system 130 to provide federated/cooperative authentication. In some implementations, partner system 150 may include user account information and/or user profiles, such as user contact information, billing information, login credentials (e.g., a user ID and a password), billing history, etc. Depending on the implementation, the information included in partner system 150 may or may not overlap with information in account manager 126 or data center 120.

Depending on the implementation, partner system 150 may also track physical content (e.g., DVDs, Blu-ray discs, memory cards, etc.) and provide metadata of physical content for inclusion in catalog information provided to users of user devices 170. In implementations described herein, partner system 150 may be controlled by a different entity (e.g., a third-party provider) than the entity controlling VCMS 110, data center 120, and/or other components of system 130.

Customer support system 160 may solicit and/or receive user feedback, questions, or credit-related requests. In one implementation, customer support system 160 may include interfaces for accessing data center 120 and/or billing server 140, for example, to receive problem reports and to resolve customer billing disputes.

User device 170 may include a computational or communication device. User device 170 may enable a user to view video content or interact with another user device 170 or a video display device (e.g., a set-top box and/or television). User device 170 may include, for example, a personal communications system (PCS) terminal (e.g., a smartphone that may combine a cellular radiotelephone with data processing and data communications capabilities), a tablet computer, a smartphone, a personal computer, a laptop computer, a gaming console, an Internet television, or other types of computation or communication devices. In some implementations, user device 170 may include a component for identifying the geographical location of user device 170 (e.g., a Global Positioning System (GPS) receiver).

In one implementation, user device 170 may include a video application that enables user device 170 to communicate with, for example, data center 120 and/or to present information received from data center 120 to a user. The video application may permit a user of user device 170 to login to an account (e.g., via application server 124, account manager 126, and partner system 150), access catalog information (e.g., from catalog server 122), submit an order, and/or consume live streaming video content (e.g., from VCMS 110). The video application may also coordinate with VCMS 110 and data center 120 in enforcing content blackout.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, billing server 140, partner system 150, and/or customer support system 160. Private network 180 may be protected/separated from other networks, such as public network 190, by a firewall. Although shown as a single element in FIG. 1, private network 180 may include a number of separate networks.

Public network 190 may include a local area network (LAN), an intranet, the Internet, a wide area network (WAN), such as a cellular network, a satellite network, a fiber optic network, a private WAN, or a combination of the Internet and a private WAN, etc. that is used to transport data. Although shown as a single element in FIG. 1, public network 190 may include a number of separate networks that function to provide services to user devices 170.

Location devices 195 may provide signals from which a device (e.g., user device 170) may determine the location of the device. Examples of location devices 195 may include cellular transmission towers, global positioning system (GPS) satellites, Galileo satellite system (GSS) satellites, Beidu navigation system satellites, etc.

In FIG. 1, the particular arrangement and number of components of network 100 are illustrated for simplicity. In practice there may be more VCMSs 110, data centers 120, billing servers 140, partner systems 150, customer support systems 160, user devices 170, networks 180/190, and/or location devices 195. Components of system 100 may be connected via wired and/or wireless links.

Figure 2:
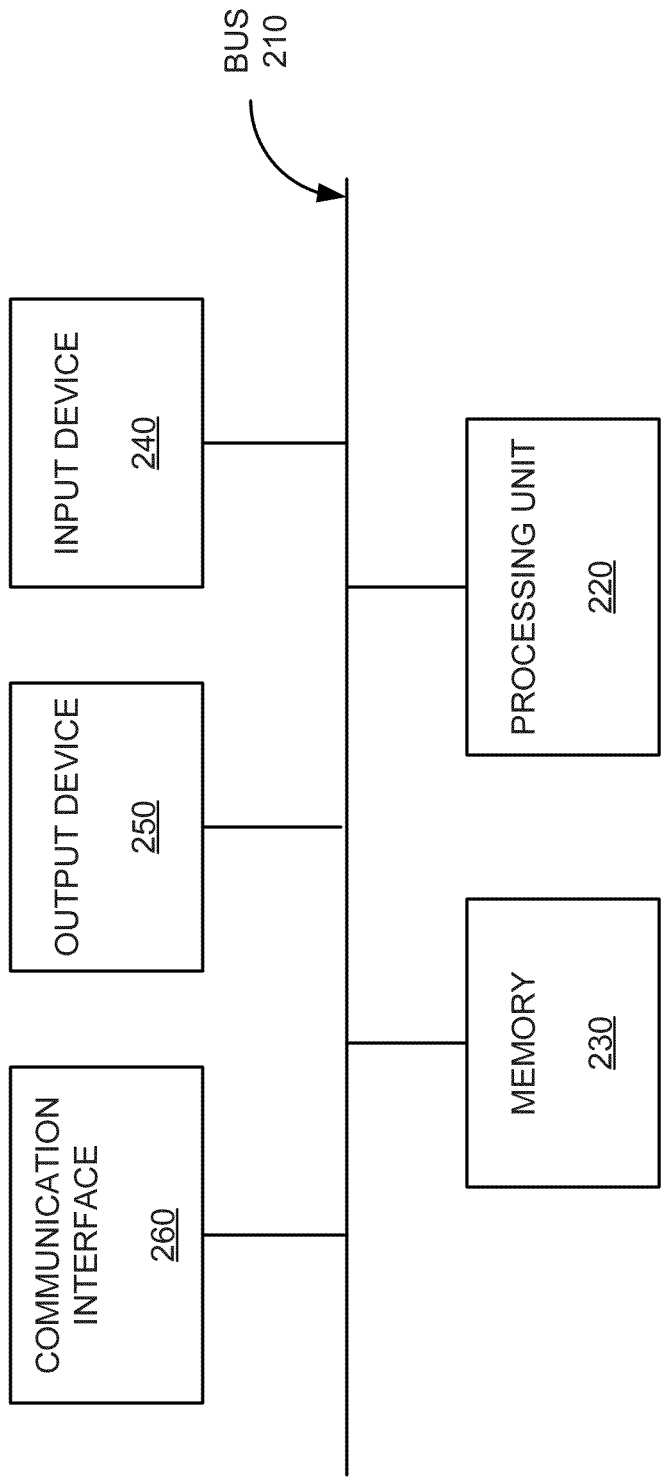
FIG. 2 is a block diagram of exemplary components of a device that may correspond to one of the devices of FIG. 1.

FIG. 2 is a diagram of exemplary components of a network device 200. Each of VCMS 110, content delivery system 112, DRM server 114, data center 120, catalog server 122, application server 124, account manager 126, billing server 140, partner system 150, and customer support system 160 may be implemented/installed as software, hardware, or a combination of hardware and software, on one or more of network device 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of system 100.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
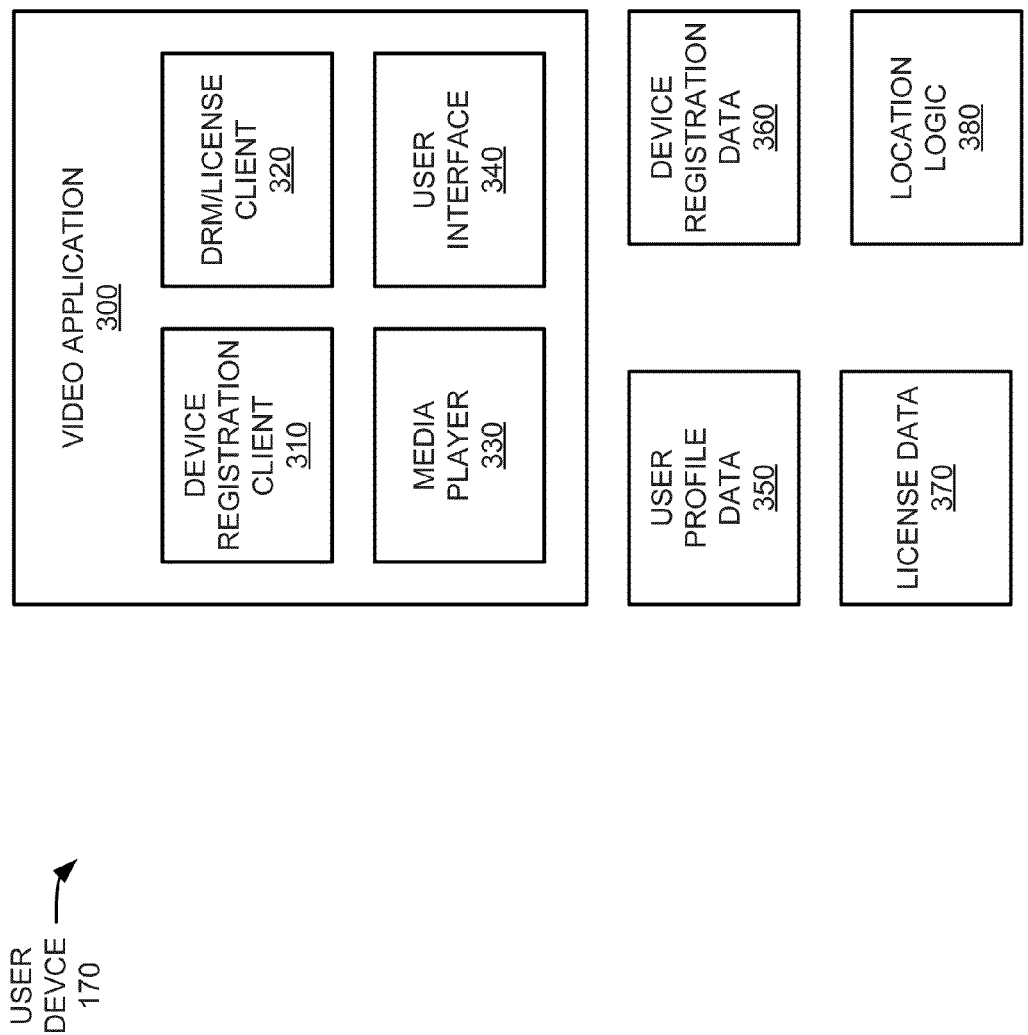
FIG. 3 is a block diagram of exemplary functional components of the user device of FIG. 1.

FIG. 3 is a block diagram of exemplary functional components of user device 170. The functions described in connections with FIG. 3 may be performed by one or more components of FIG. 2. As shown in FIG. 3, user device 170 may include video application 300, user profile data 350, device registration data 360, license data 370, and location logic 380. Depending on the implementation, user device 170 may include additional, fewer, different, or a different arrangement of devices than those illustrated in FIG. 3.

Video application 300 may include hardware and software components. The software components may be downloaded from application server 124 in data center 120 when user device 170 contacts application server 124 to enable user device 170 to play content from/via VCMS 110. Video application 300 may coordinate with VCMS 110 and data center 120 in enforcing blackouts of content.

In addition, video application 300 may enable user device 170 to perform functions that are described above, such as: playing video content or interact with another user device 170 or a video display device (e.g., a set-top box and/or television); communicating with, for example, data center 120 and/or presenting information received from data center 120 to a user, permitting a user of user device 170 to login to an account (e.g., via application server 124); accessing catalog information (e.g., from catalog server 122); submitting an order; and/or consuming live streaming video content (e.g., from VCMS 110).

As further shown in FIG. 3, video application 300 may include a device registration client 310, a DRM/license client 320, a media player 330, and a user interface 340. Depending on the implementation, video application 300 may include additional, fewer, different, or differently arranged components than those illustrated in FIG. 3. For example, in one implementation, video application 300 may not include media player 330. In such implementations, media player 330 may be or have been installed on user device 170 as a separate application.

Device registration client 310 may participate in registration of user device 170. For example, device registration client 310 may initiate a registration. To start a registration, device registration client 310 may send a message to VCMS 110 to determine whether user device 170 is registered (e.g., recognized by VCMS 110 as a device that can receive content from VCMS 110). The message may include an identifier, also known as a client ID, that is associated and distributed with video application 300.

Upon receipt of the message, VCMS 110 may indicate to device registration client 310 whether user device 170 has been registered at VCMS 110. If user device 170 has not been registered at VCMS 110, VCMS 110 may send an activation code and an activation URL to device registration client 310.

In response, the user of user device 170 may manually register user device 170. The registration may entail the user bringing up a browser at user device 170, visiting the activation URL provided by VCMS 110, authenticating the user/user device 170 at the activation URL, and upon successful authentication, inputting the activation code provided by VCMS 110. Upon successful registration, account manager 126 may return (e.g., via application server 124), a globally unique registration token to user device 170 when it contacts account manager 126. User device 170 may store the registration token, the activation code, and/or the client ID as device registration data 360.

DMR/license client 320 acquires licenses for content that is selected by a user for viewing or playing at user device 170. When a user selects particular content via user interface 340, video application 300 begins to download either metadata or the video via VCMS 110. Furthermore, DMR/license client 320 sends a request for a license to VCMS 110. The request may include all or a portion of device registration data 360 (e.g., registration token). In some implementations, the request may also include location information that identifies the location of user device. DRM/license client 320 may have obtained the location information from location logic 380. In other implementations, the request may include an identifier of the base station via which user device 170 has joined network 100 or an IP address of user device 170.

If DMR/license client 320 receives a license for the selected content from VCMS 110, DRM/license client 320 stores the license as license data 370. The license may include a decryption key, for example, to decrypt the particular content. The particular content may have been encrypted for copyright protection.

Media player 330 may decode and play content that is received via VCMS 110 and/or a CDN. Media player 330 may output the decoded video to output components (e.g., a display, speakers, etc.) of user device 170.

User interface 340 may enable a user to request a list of available content (e.g., both digital and physical content) and select from the list of available content. User interface 340 may also include an account login interface. For example, user interface 340 may request, from data center 120, a list of content available for downloading and may present the list of content to a user of user device 170. User interface 340 may include an interactive client interface that allows a user to provide input, such as user passwords, preferences, and selections from the list of available content. In one implementation, user interface 340 may indicate a user's selection (e.g., from the catalog) to data center 120 and, in return, receive session-specific information to obtain the selected content.

User profile data 350 may include a copy of a user-specific information and session-specific information obtained from data center 120. For example, user profile data 350 may include a profile, which is also stored at account manager 126. As described above with reference to account manager 126, a profile a may include information needed for determining entitlements. For example, a profile may include/specify a device registration token, the maximum number of viewing sessions for the user, the maximum number of total viewing sessions for the user, video quality right, user device identifiers (e.g., a media player identifier, a mobile device identifier, a set top box identifier, a personal computer identifier) for user devices 170 associated with the user.

User profile data 350 may also include, for example, login information (e.g., a user identifier and a password); billing information; address information; types of services to which the user has subscribed; a list of digital/physical content purchased by the user; a list of video content rented by the user; a list of video content to which the user has subscribed; a video application identifier associated with the video application obtained from application server 124; etc. User profile data 350 may also include session-specific information, such as, for example, cookies, URLs, or other information to enable user device 170 to access content delivery system 112 and DRM server 114.

Device registration data 360 may include, as described above, for example, information received from VCMS 110 or data center 120 during registration. For example, device registration data 360 may include the registration token, the activation code, and/or the client ID.

License data 370 may include a license key or a decryption key received from VCMS 110. When DRM/license client 320 sends a request for a license key for selected content to VCMS 110, VCMS 110 may issue a license key to DRM/license client 320. As described above, DRM/license client 320 may store the license key as license data 370. A license key may be used (e.g., by media player 330 or another component) to decrypt video content that was encrypted for copyright restriction.

Location logic 380 may determine the location of user device 170 based on signal/data from location device 195 (e.g., coordinates, an ID of the base station via which user device 170 joins network 100, IP address, etc.). Location logic 380 may output location information based on the determined location and provide the location information to another component in user device 170, such as DRM/license client 320. Depending on the implementation, when video application 300 requests a license to view/play particular content from VCMS 110, video application 300 may send the location information obtained from location logic 380 (as part of the license request) to VCMS 110.

Figure 4:
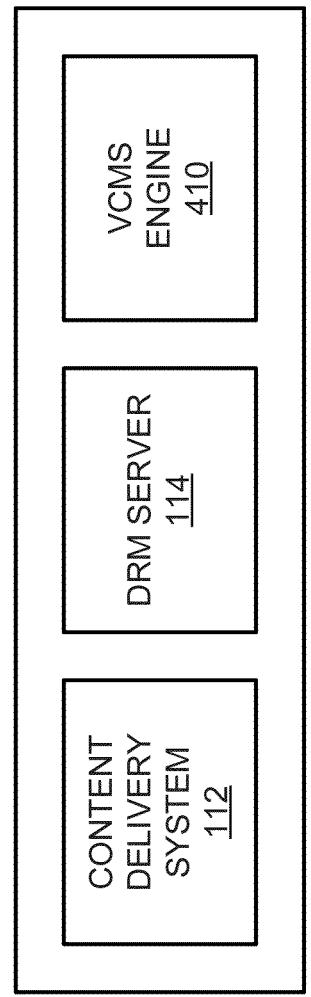
FIG. 4 is a block diagram of exemplary functional components of the video content management system (VCMS) of FIG. 1.

FIG. 4 is a diagram of exemplary functional components of VCMS 110. In one implementation, the functions described in connection with FIG. 4 may be performed by one or more components of device 200 (FIG. 2). As shown in FIG. 4, VCMS 110 may include content delivery system 112, DRM server 114, and VCMS engine 410. Content delivery system 112 and DRM server 114 may include some features described above in connection with, for example, FIGS. 1-3.

VCMS engine 410 may receive catalog item descriptors and/or metadata (e.g., for physical assets) from partner system 150. VCMS engine 410 may also receive catalog metadata for digital content from other partner systems and content providers (not shown). VCMS engine 410 may compile catalog metadata from partner system 150 and from digital content providers and provide a unified catalog file to catalog server 122.

VCMS engine 410 may also receive and encrypt digital content (e.g., corresponding to catalog metadata) for secure distribution to user devices 170. In some instances, encryption may require an encryption key, which VCMS engine 410 may retrieve via DRM server 114. After encryption, VCMS engine 410 may provide the encrypted content to content delivery system 112.

In one implementation, VCMS engine 410 may also generate a settlement file that may be used to help billing server 140 determine settlement cost with content sources. For example, VCMS engine 410 may generate a monthly statement summarizing and/or itemizing downloads or streaming events by content source.

DRM server 114 may receive a request for DRM license from user device 170 for user-selected content. Upon receipt of the request, DRM server 114 may connect to account manager 126 and forward information provided in the request. The forwarded information may include a registration token. In some implementations, the information may also include location information of user device 170, an IP address of user device 170, or an ID of the base station via which user device 170 joins network 190. The forwarded information may be used to verify that a requesting user device 170 is entitled to receive the requested content before DRM server 114 issues a DRM license.

Depending on the implementation, either DRM server 114 or VCMS engine 410 may respond to a request from user device 170 to determine whether user device 170 is registered. Upon receipt of a client ID from user device 170, DRM server 114/VCMS engine 410 may determine whether user device 170 is registered, for example, by consulting account manager 126. If account manager 126 indicates that user device 170 is registered, DRM server 114/VCMS engine 410 may indicate to user device 170 that user device 170 has been registered. If account manager 126 indicates that user device 170 is not registered, DRM server 114/VCMS engine 410 may generate, via account manager 126 or on its own, an activation code (e.g., a 16 bit code) and an activation URL identified based on the client ID. DRM server 114/VCMS engine 410 may forward the activation code to user device 170.

Content delivery system 112 may receive encrypted content from VCMS engine 410 and may provide the encrypted content to requesting user devices 170.

Figure 5:
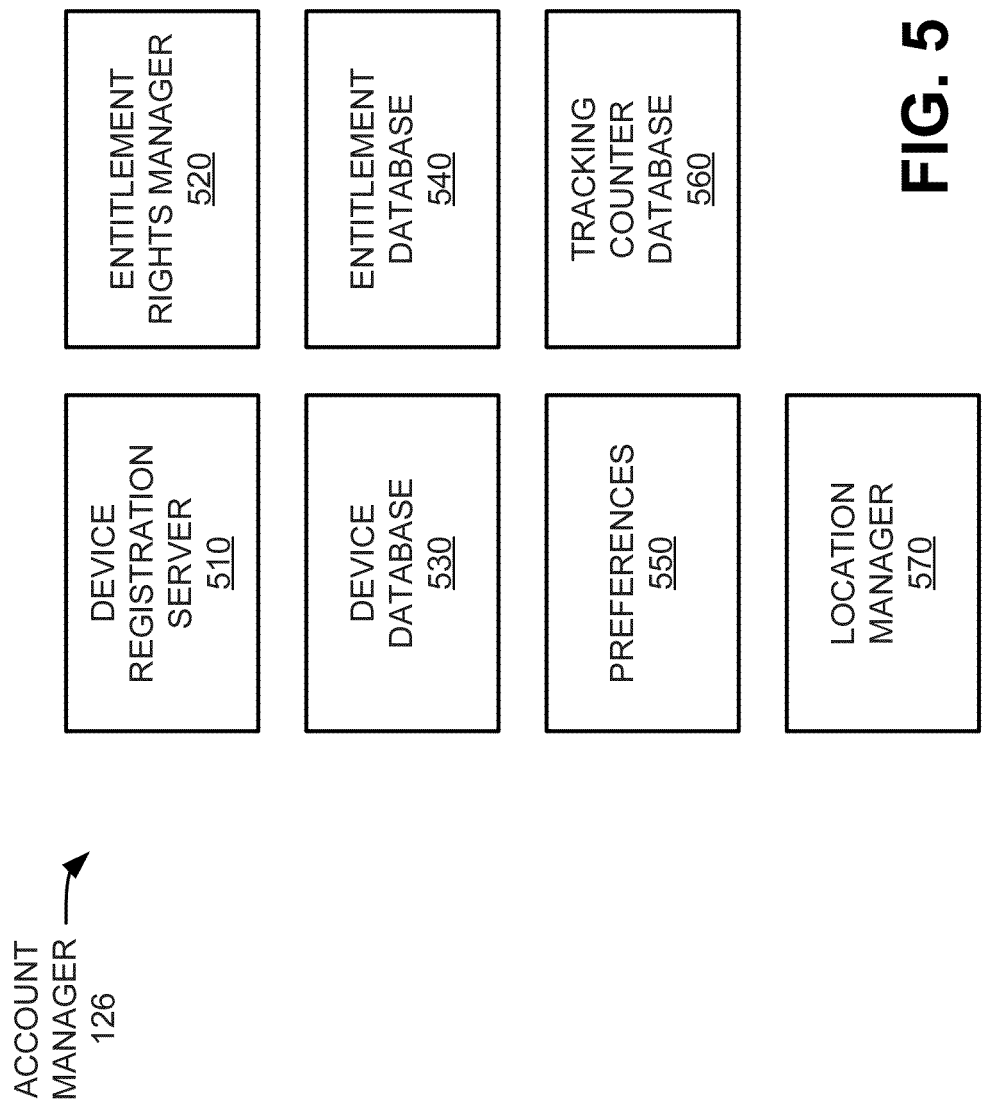
FIG. 5 is a block diagram of exemplary functional components of the account manager of FIG. 1.

FIG. 5 is a diagram of exemplary functional components of account manager 126. In one implementation, the functions described in connection with FIG. 5 may be performed by one or more components of device 200 (FIG. 2). As shown in FIG. 5, account manager 126 may include a device registration server 510, an entitlement rights manager 520, a device database 530, an entitlement database 540, preferences 550, a tracking counter database 560, and a location manager 570. Depending on the implementation, account manager 126 may include additional, fewer, different, or a different arrangement of components than those illustrated in FIG. 5.

Device registration server 510 may register user device 170 when device registration server 510 receives, via VCMS 110, a request for device registration from video application 300 on user device 170. When device registration server 510 receives a registration request, which includes a client ID and an activation code, from user device 170, device registration server 510 validates the client ID and the activation code (e.g., looking up a table (not shown)). Upon successful validation, device registration server 510 creates a globally unique registration token for identifying user device 170, and associates the registration token with a user account of the user of user device 170. Device registration server 510 may store the association in device database 530 (e.g., along with the activation code and the client ID).

In some implementations, device registration server 510 may receive a request, from user device 170 via VCMS 110, to determine whether user device 170 associated with a client ID is registered ("active"). In such implementations, device registration server 510 may determine whether the client ID is in device database 530 (or another database). If the matching ID is found in device database 530 (or another database), device registration server 510 may send a message to user device 170, indicating that user device 170 is already registered. If user device 170 has not been registered (e.g., there is no matching client ID in registration database 530), device registration server 510 may generate an activation code and an activation URL and forward them to user device 170.

Entitlement rights manager 520 may receive a request, from DRM server 114, to verify that video application 300 on user device 170 is entitled to view/play selected digital content. In verifying the entitlement, entitlement rights manager 520 may consult entitlement database 540 and/or other components to: verify whether a registration token, which was issued by device registration server 510 during user device 170 registration, is valid; determine whether content streaming right has been granted; determine whether, if selected content is blackout content, user device 170 is located outside of a corresponding blackout region; determine whether the viewing/playing time for the content is within a blackout time; determine whether a particular video quality right has been granted to the user; determine whether the total number of concurrent viewing/playing sessions on user devices 170 associated with a user exceeds a maximum provided in the subscription package purchased by the user; and/or determine whether a total number of viewing sessions for the user of user device 170 exceeds the maximum provided in the subscription package purchased by the user.

Depending on the implementation, in determining whether user device 170 is located outside of a blackout region, entitlement rights manager 520 may use the location information of user device 170, the base station ID, or the IP address of user device 170 provided by DRM server 114. If entitlement rights manager 520 is given a base station ID or an IP address associated with user device 170, entitlement rights manager 520 may pass, in a request to location manager 570, the base station IDs or the IP address. In response the request, location manager 570 may obtain location information that identifies the location of user device 170 and provide the location information to entitlement rights manager 520.

Once entitlement rights manager 520 has/obtains location information for user device 170, entitlement rights manager 520 may determine whether the location identified by the location information is within a blackout region for the content. Entitlement rights manager 520 may identify the blackout region for the content from looking up one or more of: entitlement database 540, catalog information in data center 120, metadata for the content, user account information, subscription information, etc.

Entitlement rights manager 520 may also determine whether the viewing/playing time for the content is within a blackout time. In making the determination, entitlement rights manager 520 may obtain the current time from a system clock, the duration of the content, and/or the blackout time from looking up one or more of: entitlement database 540, catalog information in data center 120, metadata for the content, user account information, subscription information, etc. Entitlement rights manager 520 may conclude that the viewing/playing time for the content is within the blackout time when the current time is within the blackout time.

Device database 530 may include a database of user devices 170 that have been registered. In some implementations, for each device that is registered, device database 530 may include a registration token, a client ID, an activation code, an activation URL, the type of device, etc.

Entitlement database 540 may include a database of users' entitlement rights. Entitlement rights manager 520 may use entitlement database 540 to enforce what content a user can view on which device. For example, if a user purchased a particular movie, the user may be able to view the movie only on certain user devices 170 (e.g., a television, a personal computer, and/or or registered mobile devices). The entitlement data may identify/indicate, for example: contents for which the user has a streaming right; video quality rights; blackout regions corresponding to the contents; blackout times correspond to the contents; a total number of allowed sessions for the user's subscription; the maximum allowed number of concurrent viewing sessions; type of content (e.g., movies, TV shows, games, etc.) which the user is entitled to play/view; different types of devices on which the user may view/play content; whether the user is allowed to download; etc. Entitlement database 540 may have been built/constructed from data obtained from other systems/devices, such as a catalog in data center 120, partner system 150, etc. In some implementations, some of the information described above as being included in entitlement database 540 may be included in other components/databases, such as catalogs, metadata for the selected content, etc.

Preferences 550 may include users' preferences that are associated with accessing, purchasing, and/or playing content. For example, preferences 550 may include indications what genre of content the user prefers (e.g., adventure, comedy, drama, horror, etc.), preferred ratings (e.g., PG, G, R, etc.), user's bookmarks, parental settings for the user, etc.

Tracking counter database 560 may include one or more tracking counters. Each tracking counter corresponds to a user/user account. For a given user, a tracking counter may indicate which of the user's devices are currently engaged in sessions for receiving content from VCMS 110. In addition, a tracking counter may include the total number of sessions that the user has conducted. Entitlement rights manager 520 uses tracking counter database 560 to determine whether the total number of viewing sessions for a user exceeds the maximum number specified in a subscription package of the user. In addition, entitlement rights manager 520 uses tracking counter database 560 to determine whether the total number of concurrent viewing sessions exceeds the maximum number specified in the subscription package.

Location manager 570 may receive, from another component (e.g., entitlement rights manager 520) a request to identify locations of user devices. In one implementation, location manager 570 may receive either an IP address of user device 170 or one or more IDs of base stations via which user device 170 accesses network 100 or with which user device 170 is associated.

When location manager 570 receives an IP address and user device 170 is a stationary device, location manager 570 may obtain the location of user device 170 based on the IP address. For example, in-home devices can be identified by the WAN side IP address of a home router, whose geo-location information may be obtained as a house street address. Once the street address is known, location manager 570 may translate the street address into coordinates that the requesting component can use. When location manager 570 receives one or more base station IDs, location manager 570 may obtain the location of user device 170 based on either a table lookup or via further function calls, for example, to another component, to obtain the location of user device 170. If location manager 570 receives more than one base station ID, location manager 570 may triangulate the location of user device 170.

Figure 6:
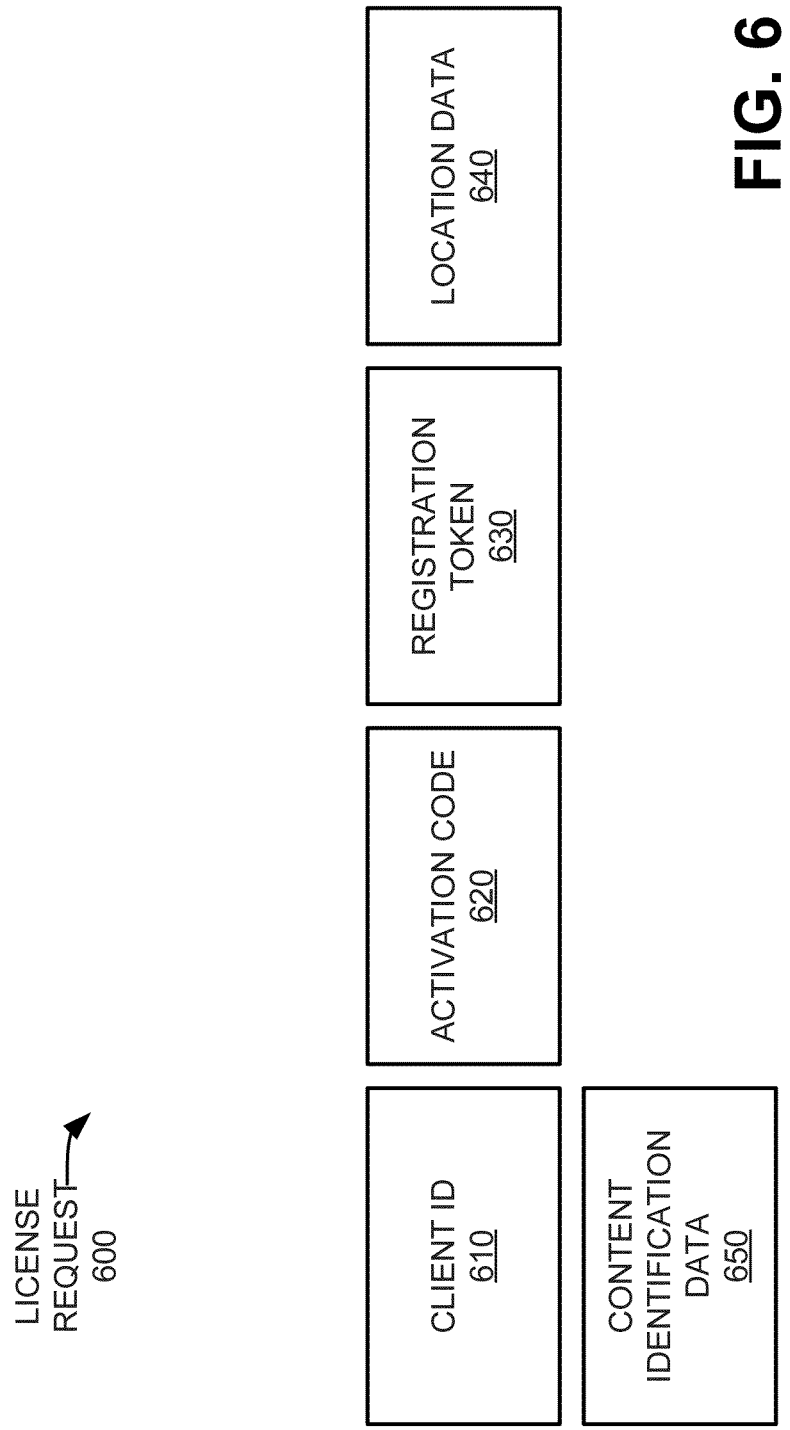
FIG. 6 is a diagram of an exemplary request for a license.

FIG. 6 is a diagram of an exemplary request 600 for a license. Video application 300 may issue request 600 upon the start of a video download from VCMS 110. All or a portion(s) of the information in request 600 may be passed (along with other information) from DRM server 114 in VCMS 110 to entitlement rights manager 520, and then to another component, such as location manager 570. As shown, request 600 may include a client ID 610, an activation code 620, a registration token 630, location data 640, and content identification data 650. Depending on the implementation and configuration of system 130/user device 170, license request 600 may include additional, fewer, different, or a different arrangement of data/information than those illustrated in FIG. 6. For example, in some instances, when the user of user device 170 has not agreed to provide location information to system 130 due to privacy concerns, request 600 may not include location data 640.

Client ID 610 may include an identifier that is provided with video application 300 when video application 300 is downloaded from application server 124. In some implementations, when client ID 610 is provided as part of request 600 to DRM server 114, DRM server 114 may pass client ID 610 to device registration server 510, for verification.

Activation code 620 may include a code that is provided by device registration server 510 to user device 170 when user device 170 is not yet registered with system 130. As described above, when the user of user device 170 receives the activation code, the user may visit the URL (e.g., via a browser), authenticate at the URL, and input the activation code. Thereafter, application server 124 may forward the activation code and the client ID to registration server 510, which may validate the client ID and the activation code. Upon successful validation, device registration server 510 may generate a registration token to user device 170. In some implementations, when activation code 620 is provided as part of a license request 600 to DRM server 114, DRM server 114 may pass activation code 620 to device registration server 510 for verification.

Registration token 630 may include a registration token that is generated by device registration server 510 when user device 170 is registered with system 130, and provided to user device 170. When registration token 630 is received from user device 170 as part of license request 170, DRM server 114 may use registration token 630 (along with other codes, depending on the implementation) to identify user device 170, before issuing a license key. In some implementations, DRM server 114 may pass registration token 630 to device registration server 510 to identify user device 170.

Location data 640 may include information that either identifies the location of user device 170 or be used to identify the location of user device 170. As discussed above, location data 640 may include an IP address, one or more base station IDs, coordinates (e.g., obtained from location device 195 by user device 170), etc.

When DRM server 114 in VCMS 110 receives request 600 from user device 170, DRM server 114 may pass location data 640 (along with other data) to entitlement rights manager 520. When license request 600 does not include location data 560, however, DRM server 114 may obtain location data (e.g., ID of the base station via which user device 170 accesses network 100) from other devices in network 100.

As described above, entitlement rights manager 520, in turn, may pass the location the location data to location manager 570, which may output location information that identifies the location of user device 170. Entitlement rights manager 520 may use the location information provided by location manager 570 to determine whether user device 170 is within a blackout region.

Content identification data 650 may identify content for request 600 requests a license key from VCMS 110.

In system 130, user device 170 may need to register with system 130 before user device 170 can request a license key. After the registration, during an acquisition of a license key, if entitlement rights manager 520 of data center 120 determines that user-selected content is inside a blackout regions and/or a blackout time for the content, DRM server 114 withholds the license key from being issued to user device 170, enforcing content blackout.

Figure 7:
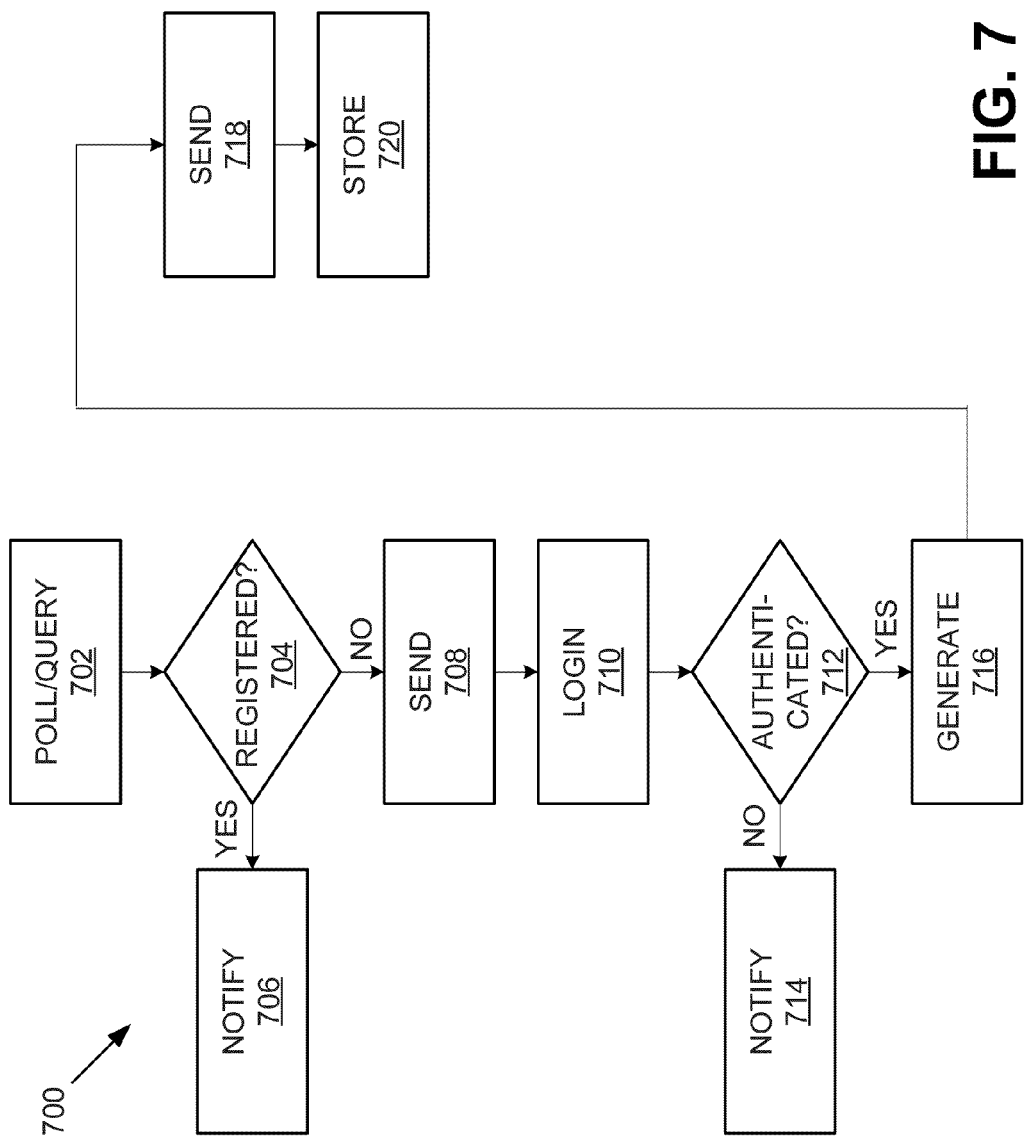
FIG. 7 is a flow diagram of an exemplary process that is associated with registering the user device of FIG. 1.

FIG. 7 is a flow diagram of an exemplary process 700 that is associated with registering user device 170. Process 700 is described below with reference to FIG. 8, which shows a flow of messages between video application 300 of user device 170 and device registration server 510. Assume that video application 300 is installed on user device 170.

Figure 8:
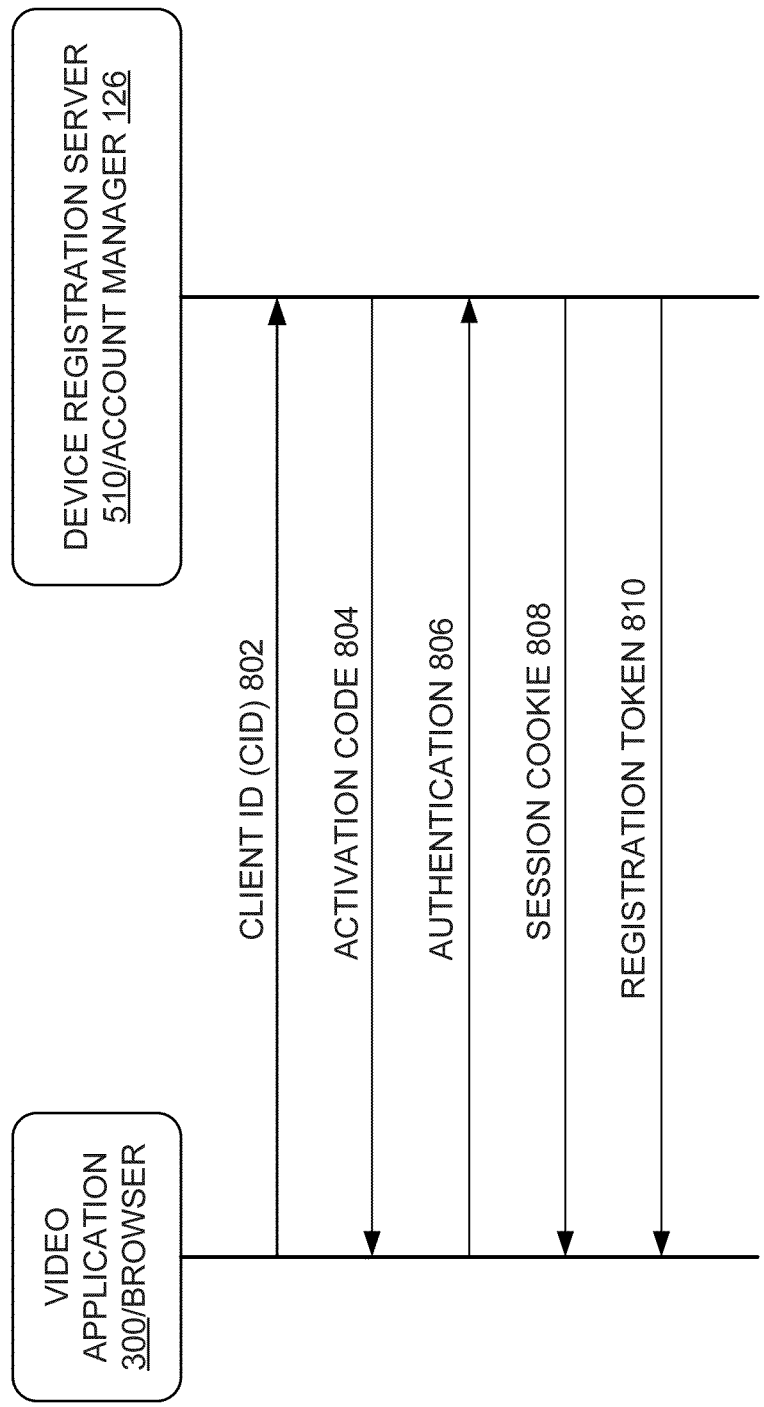
FIG. 8 is a diagram illustrating the flow of messages between the video application of FIG. 3 or a browser and the account manager of FIG. 1 or device registration server of FIG. 5.

Process 700 includes video application 300 polling or querying device registration server 510 (via VCMS 110) (block 702). As shown in FIG. 8, the polling or querying device registration server 510 may entail sending a message that includes a client ID 802 to device registration server 510 via VCMS 110. Upon receipt of the message, device registration server 510 may determine whether user device 170 is registered (block 704). In some implementations, device registration server 510 may examine information associated with the client ID (provided in the poll/query) in device database 530, for example.

If the information indicates that user device 170 is registered (block 704: yes), device registration server 510 may notify user device 170 that user device 170 is registered/active (block 706). If the information indicates that user device 170 is not registered (block 704: no), device registration server 510 or DRM server 114 may generate an activation code and an activation URL and send the code 804 and the URL to user device 170 (block 708). Upon receipt of the activation code and the activation URL from device registration server 510, user device 170 may display the code and the URL to the user. The user may open a browser, and visit the URL.

Account manager 126 may receive, from the user at user device 170, a request for login or authentication 806 (block 710) via the browser. Account manager 126 may perform a federated/collaborative authentication process with one or more partner systems 150. If the authentication is not successful (block 712: no), account manager 126 may notify user device 170 of the authentication failure (e.g., via application server 124) (block 714).

Otherwise (block 712: yes), account manager 125 sends a session cookie 808 to user device 170. Given the session cookie, the browser may establish a session with a component in system 130 (e.g., device registration server 510). During the session, device registration server 510 may receive, via application server 124, the activation code (input by the user at user device 170) and the client ID. Device registration server 510 may then validate the activation code and the client ID; generate a globally unique registration token; and associate the registration token with the user account (block 716). Device registration server 510 may send the globally unique registration token 810 to user device 170 (e.g., via application server 124) (block 718). Furthermore, device registration server 510 may store the registration information (e.g., the registration token, the client ID, the activation code, the association between the token and the user account, etc) in device database 530 (block 720). User device 170 may store the registration token in its local storage.

Figure 9:
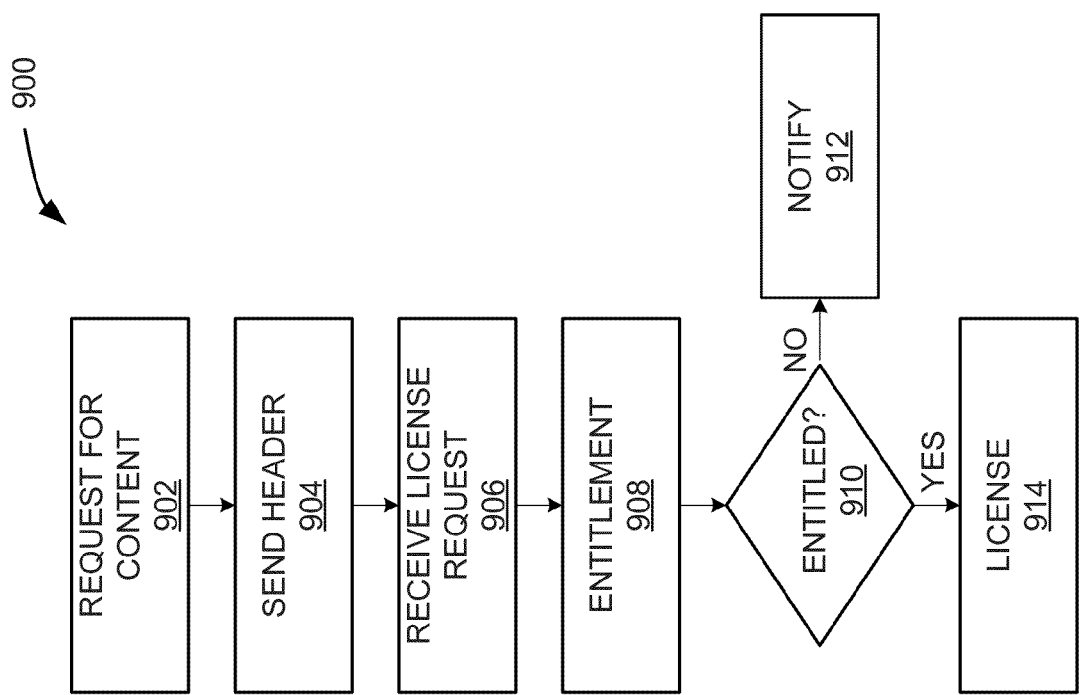
FIG. 9 is a flow diagram of an exemplary process for obtaining a license key for user requested content.

FIG. 9 is a flow diagram of an exemplary process 900 for obtaining a license key for user-requested content. After a registration of user device 170, user device 170 may request user-selected content and a license key from VCMS 110 in accordance with process 900. VCMS 110 withholds a license key from being issued to user device 170, if user device 170 is inside a blackout region and/or a blackout time. Accordingly, system 130 enforces content blackout.

Figure 10:
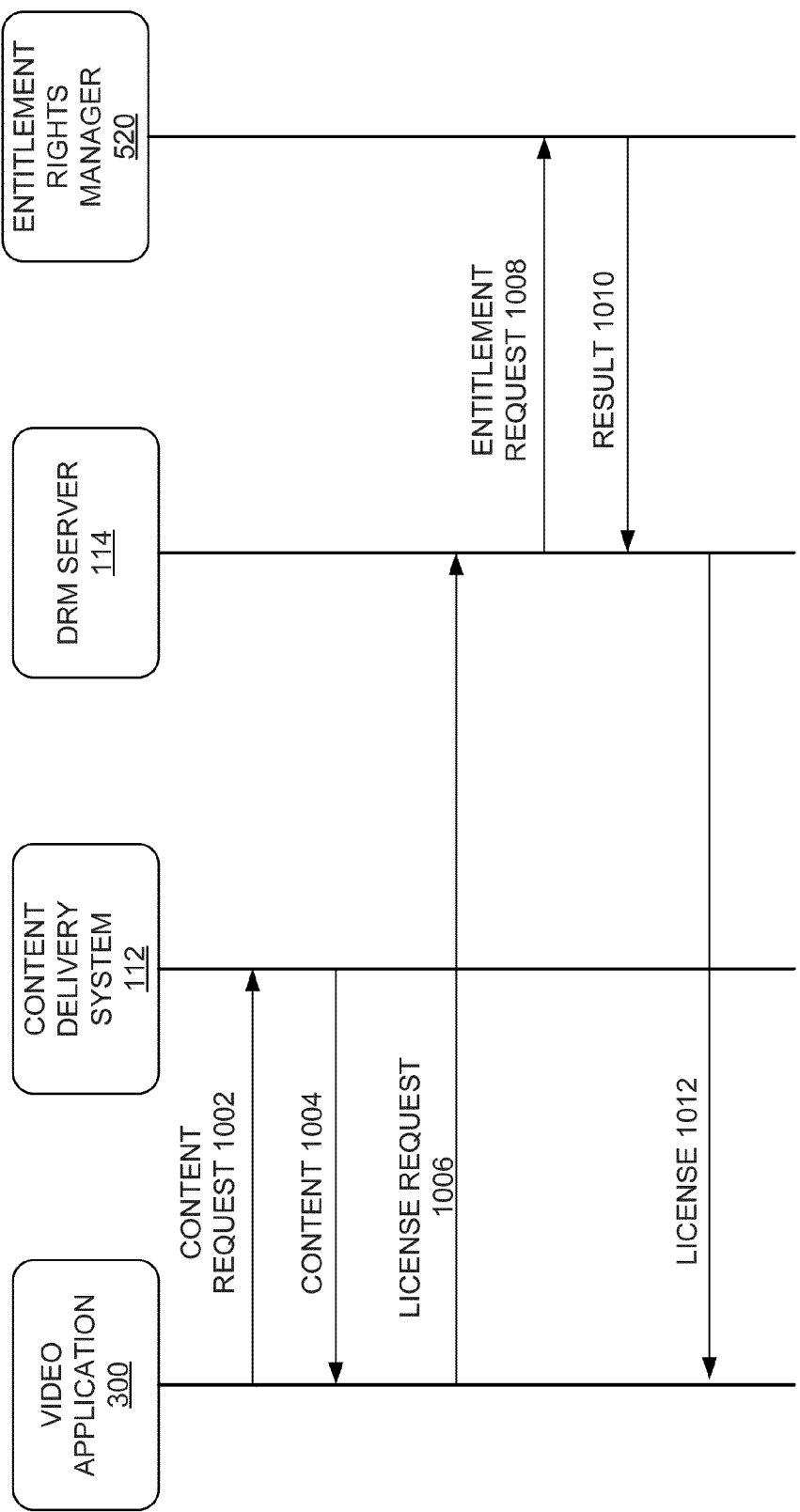
FIG. 10 is a diagram illustrating the flow of messages between the video application of FIG. 3, the content delivery system of FIG. 1, the digital rights management (DRM) server of FIG. 1, and the entitlement rights manager of FIG. 5.

Process 900 is described below with reference to FIG. 10, which shows a flow of messages between video application 300 of user device 170, content delivery system 112, DRM server 114, and entitlement rights manager 520 of account manager 126. Assume that video application 300 is installed on user device 170, and that user device 170 has been registered via device registration server 510.

Process 900 may include video application 300 in user device 170 sending a request 1002 for user selected content to VCMS 110 (block 902). When content delivery system 112 of VCMS 110 receives the request, content delivery system 112 may begin to stream/upload content 1004 to user device 170, including a header associated with the content (block 904). The content may be encrypted, and video application 300 may be unable to play/view the content without a license or a decryption key.

When the header associated with the content is downloaded to video application 300, video application 300 may issue, to DRM server 114 in VCMS 110, a request for license/decryption key 1006 (e.g., license request 600) (block 906). Upon receipt of the request, DRM server 114 may request 1008 entitlement rights manager 520 to determine whether user device 170 is entitled to play/view the content. Request 1008 may include information provided in license request 600. If request 1008 does not include location data 640, DRM server 114 may obtain location information from other components in system 130/network 100, and pass the location information (e.g., base station ID) to entitlement rights manager 520.

In response, entitlement rights manager 520 may consult entitlement database 540 and/or location manager 570 to verify whether the user is entitled (block 908), and return the result 1010 of the verification to DRM server 114. A process that is associated with verifying the entitlement is described below with reference to FIG. 11. The process associated with verifying the entitlement includes determining whether user device 170 is outside of blackout region(s), and blackout time(s).

If user device 170 is not entitled to play the content (block 910: no), DRM server 114 may notify user device 170 that user device 170 may not view/play the content (block 912). If user device 170 is entitled to play the content (block 910: yes), DRM server 114 may generate/produce a license key and/or a decryption key. DRM server 114 may send the license key/decryption key 1012 to user device 170 (block 914). Video application 300 may store the license key/decryption key as license data 370 and use the license key/decryption key to decrypt the content. Video application 300 may play the decrypted content via output devices 250 (e.g., display, speakers, etc.).

Figure 11:
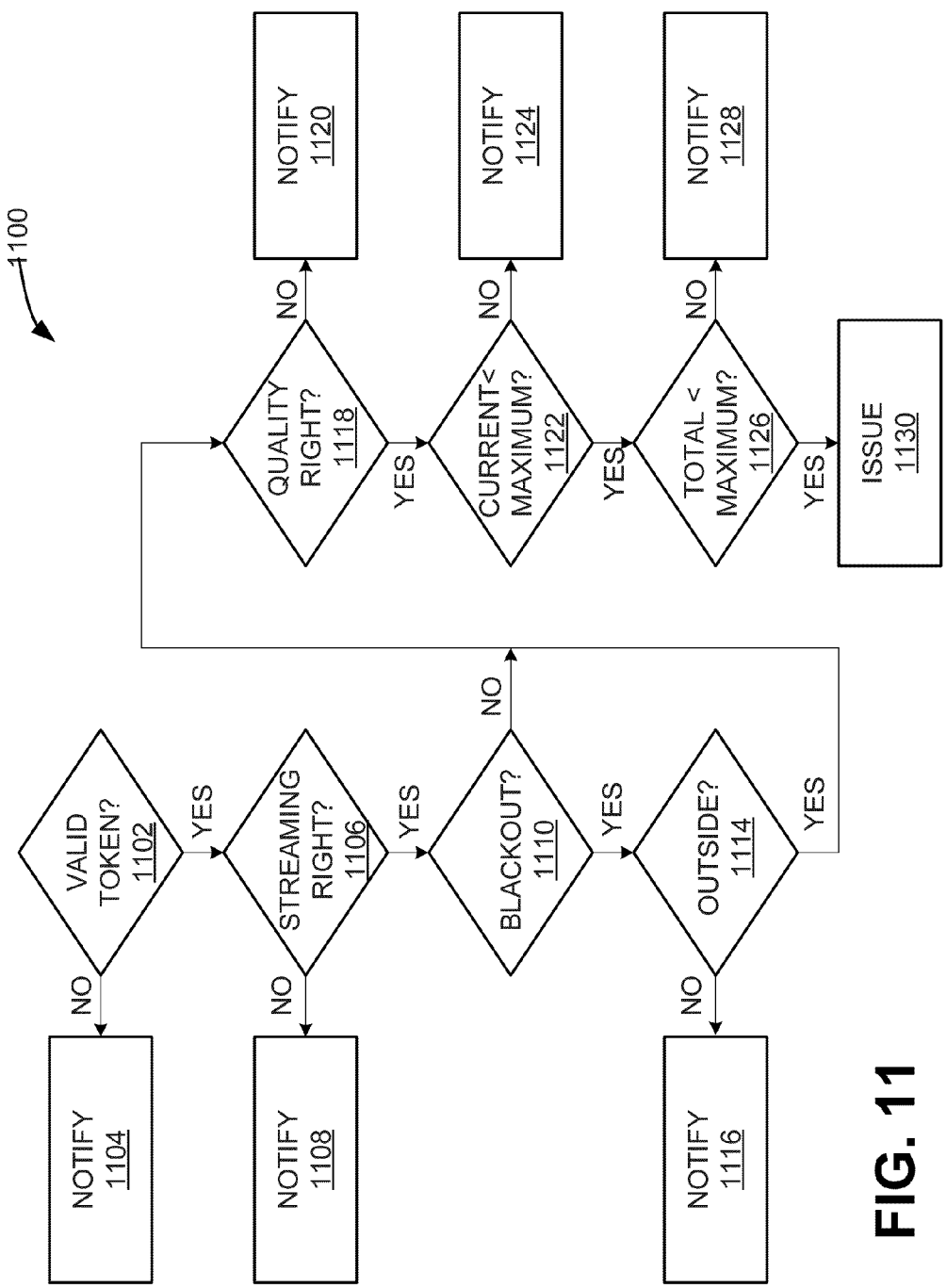
FIG. 11 is a flow diagram of an exemplary process that is associated with validating entitlement.

FIG. 11 is a flow diagram of an exemplary process 1100 that is associated with validating entitlement. Process 1100 is also associated with block 908 of process 900 and includes validating whether user device 170 is outside of blackout regions(s) and/or blackout time(s). As shown, process 1100 may include determining whether a registration token provided by user device 170 via DRM server 114 to entitlement rights manager 520 is valid (block 1102). For example, entitlement rights manager 520 may request device registration server 510 in account manager 126 to provide a registration token stored in device database 530. Furthermore, entitlements rights manager 520 may compare the registration token provided by user device 170 to the registration token provided by device registration server 510.

If the registration token from user device 170 is not valid (e.g., the registration token from user device 170 does not match the token provided by device registration server 510) (block 1104: no), entitlement rights manager 520 may notify DRM server 114 that user device 170 is not entitled to play/ view the content (block 1104). Otherwise (block 1102: yes), entitlement rights manager 520 may proceed to block 1106.

At each of blocks 1106, 1110, 1114, 1118, 1122, and 1126, entitlement rights manager 520 may consult device database 530, entitlement database 540, a content catalog (not shown), tracking counter database 560, and/or location manager 570 to determine whether user device 170 or the user of user device 170 satisfies conditions(s) for a particular entitlement. In addition, entitlement rights manager 520 may use the information provided by DRM server 114, including location information.

At block 1106, entitlement rights manager 520 may determine whether user device 170 has a streaming right for the selected content (block 1106). If entitlement database 540 indicates that the user/user device 170 does not have a streaming right (block 1106: no), entitlement rights manager 520 may notify DRM server 114 that the user/user device 170 lacks the entitlement right (block 1108). Otherwise (block 1106: yes), process 1100 may proceed to block 1110.

Entitlement rights manager 520 may determine whether the selected content is blackout content (content that is prohibited from being distributed or played in a blackout region (s) or during a blackout time(s)) (block 1110). In determining whether the selected content is blackout content, depending on the implementation, entitlement right manager 520 may inspect information received from user device 170 via DRM server 114 and/or examine the following databases/data source for an indication of whether the content is blackout content: a catalog of contents; entitlement database 540; user account information in account manager 126 or partner system 150: etc.

If the content is not blackout content (block 1110: no), entitlement rights manager 520 may proceed to block 1118. If the content is blackout content (block 1110: yes), entitlement rights manager 520 may determine whether user device 170 is outside of a blackout region (e.g., a region in which the content is to be blacked out) (block 1114) and/or blackout time.

In determining whether user device 170 is outside the blackout region, entitlement rights manager 520 may use information, provided by DRM server 114. If the information does not directly identify the location of user device 170 (e.g., the information is the IP address of user device or provides base station ID(s)), entitlement rights manager 170 may pass the information to location manager 570, to identify the location of user device 170.

If user device 170 is not outside of the blackout region (block 1114: no) or not outside of blackout time (e.g., the current time is in a blackout time(s)), entitlement rights manager 520 may notify DRM server 114 that user device 170 is not entitled to play the content (block 1116). Otherwise (block 1114: yes), process 1100 may proceed to block 1118.

Entitlement rights manager 520 may determine whether user device 170 is entitled to play the content at a particular quality (e.g., high definition) (block 1118). The quality may depend on the package to which the user of user device 170 is subscribed. If the user is not entitled (block 1118: no), entitlement rights manager 520 may notify DRM server 114 that the user device 170 is not entitled to play the content (block 1120). Otherwise (block 1118: yes), entitlement rights manager 520 may proceed to block 1122.

Entitlement rights manager 520 may determine whether the number of concurrent viewings is less than the maximum number of current viewings specified in the subscription package to which the user of user device 170 is subscribed (block 1122). Entitlement rights manager 520 may determine the number of concurrent viewings by examining tracking counter database 560 and counting the number of user devices 170 (that belong to the user) whose flags are "on." In addition, depending on the implementation, entitlement rights manager 520 may determine the maximum number of allowable concurrent viewings by looking up a database (e.g., device database 530, entitlement database 540, preferences 550, or another database in partner system 150).

If the number of concurrent viewings is not less than the maximum (block 1122: no), entitlement rights manager 520 may notify DRM server 114 that user device 170 is not entitled to play the content (block 1124). Otherwise (block 1122: yes), entitlement rights manager 520 may proceed to block 1126.

Entitlement rights manager 520 may determine whether the total number of viewings (e.g., over a period of time) is greater than the maximum number of total viewing allowed under the user's subscription package (block 1126). Entitlement rights manager 520 may obtain the total number of viewings by looking up, inside tracking counter database 560, a tracking counter corresponding to user device 170. In addition, depending on the implementation, entitlement rights manager 520 may obtain the maximum total number of allowed viewings that is allowed under the user's subscription package by looking up the information in a database (e.g., device database 530, entitlement database 540, preferences 550, or another databases in partner system 150).

If the total number of viewings for the user is not less than the maximum (block 1126: no), entitlement rights manager 520 may notify DRM server 114 that user device 170 is not entitled to play the content (block 1128). If the total number of viewings is less than the maximum (block 1126: yes), entitlement rights manager 520 may issue a notification to DRM server 114, indicating that user device 170 has the entitlement right to play the content (block 1130).

As described above, system 130 enforces blackouts of content. To use user device 170 with system 130, the user may download video application 300 onto user device 170, after which the user may register device 170 at system 130. During the registration, system 130 sends a unique device registration token to user device 170. When video application 300 requests user-selected content to be streamed from system 300, system 300 ensures that user device 170 receiving the content has: the registration token; a streaming/downloading right; a right to view the content at a particular level of quality; etc. In addition, system 130 and video application 300 ensure that, if the selected content is blackout content, user device 170 is permitted to play the content only if user device 170 is outside of blackout regions(s) and blackout times for the content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7, 9, and 11, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   receiving, at a system, from a user device of a user over a network, a request for content;
   initiating an upload of the requested content to the user device in response to the request;
   receiving a request for a license key from the user device in response to the initiation of the upload;
   determining whether the user device is outside a blackout region associated with the requested content;
   determining whether one or more criteria associated with entitlement rights to play the requested content by the user device are met;
   generating a license key when it is determined that the user device is outside the blackout region associated with the requested content and when it is determined that the one or more criteria associated with the entitlement rights to play the requested content by the user device are met; and
   sending the license key to the user device,
   wherein the one or more criteria include at least one of a device registration token, a maximum number of concurrent viewing sessions for the user, a maximum number of total viewing sessions for the user, and a video quality right.

2. The method of claim 1, further comprising:
   receiving, from the user device, location information identifying a location of the user device, wherein determining whether the user device is outside the blackout region includes determining whether the identified location is outside the blackout region.

3. The method of claim 2, wherein receiving, from the user device, the location information includes at least one of:
   receiving an Internet Protocol (IP) address of the user device;
   receiving an identifier of a base station via which the user device is connected to the network; or
   receiving location coordinates of the user device.

4. The method of claim 1, further comprising determining whether the requested content is blackout content.

5. The method of claim 1, further comprising determining whether a current time is outside of a blackout time for the content, wherein generating the license key includes:
   generating the license key when it is determined that the current time is outside of the blackout time, when it is determined that the user device is outside the blackout region, and when it is determined that the zero or more criteria associated with the entitlement rights to play the requested content by the user device are met.

6. The method of claim 1, further comprising:
   not generating the license key or not sending the license key when it is determined that the user device is not outside the blackout region or when it is determined that the one or more criteria associated with the entitlement rights to play the requested content by the user device are not met.

7. The method of claim 1, wherein determining whether the one or more criteria associated with the entitlement rights to play the requested content by the user device are met comprises at least one of:
   determining whether a total number of sessions associated with a user of the user device exceeds a predetermined number;
   determining whether the user has a right to have the content streamed to the user device; or
   determining whether the user has a right to play the content, at the user device at a particular quality level.

8. The method of claim 1, further comprising:
   sending a video application to the user device for installation, the video application including instructions, when executed by the user device, that cause the user device to:
   decrypt the requested content using the license key; and
   play the decrypted content.

9. The method of claim 1, wherein the receiving includes:
   receiving, at the system, from a video application on the user device, the request for content, wherein the video application is different from a browser.

10. The method of claim 9, further comprising:
    registering the user device with the system, wherein the registering comprises:
    sending a globally unique token that identifies the user device to a browser on the user device; and
    storing the globally unique token in a database of the system.

11. One or more devices, comprising:
    one or more network interfaces to:
    communicate, over a network, with a user device associated with a user; and
    one or more processing devices configured to:
    receive, from the user device via the one or more network interfaces, a request for content;
    initiate an upload of the requested content to the user device in response to the request;
    receive a request for a license key from the user device in response to the initiation of the upload;
    determine whether the user device is outside a blackout region associated with the content;
    determine whether one or more criteria associated with entitlement rights to play the requested content by the user device are met;
    generate a license key when the one or more processing devices determine that the user device is outside the blackout region and the one or more criteria associated with the entitlement rights to play the requested content by the user device are met; and
    send the license key to the user device,
    wherein the one or more criteria include at least one of a device registration token, a maximum number of concurrent viewing sessions for the user, a maximum number of total viewing sessions for the user, and a video quality right.

12. The one or more devices of claim 11, wherein the one or more processing devices are further configured to:
    receive, from the user device, location information identifying a location of the user device, wherein when the one or more processing devices determine whether the user device is outside the blackout region, and
    determine whether the identified location is outside the blackout region.

13. The one or more devices of claim 12, wherein the blackout region includes:
a region in which the content is not to be played by the user device according to at least one of:
a subscription package that the user has purchased;
a regulation; or
a local law.

14. The one or more devices of claim 12, wherein the location information includes at least one of:
an Internet Protocol (IP) address of the user device;
an identifier of a base station to which the user device is communicatively linked to the network; or
coordinates of the user device.

15. The one or more devices of claim 11, wherein the one or more processing devices are further configured to determine whether a current time is outside of a blackout time for the content, and wherein the one or more processing devices generate the license key when the one or more processing devices determine that the current time is outside of the blackout time and when the one or more processing devices determine that one or more criteria associated with entitlement rights to play the content by the user device are met.

16. The one or more devices of claim 15, wherein the one or more processing devices are further configured to:
not generate the license key or send the license key to the user device when the one or more processing devices determine that the user device is not outside the blackout region or when the one or more processing devices determine that one or more criteria associated with entitlement rights to play the content by the user device are not met.

17. The one or more devices of claim 15, wherein when the one or more processing devices determine whether the one or more criteria associated with the entitlement rights to play the content, by the user device, are met, the one or more processing devices are further configured to:
determine whether a total number of sessions associated with the user exceeds a predetermined number;
determine whether the user has a right to have the content streamed to the user device; or
determine whether the user has a right to play the content, at the user device, at a requested quality level.

18. The one or more devices of claim 11, wherein the one or more processing devices are further configured to:
send a video application to the user device via the one or more network interfaces for installation, the video application including instructions, when executed by the user device, that cause the device to:
decrypt the requested content using the license key; and
play the decrypted content.

19. A device comprising:
a network interface to communicate with a remote system; and
at least one processing device configured to:
register the device with the remote system when the device is not registered with the remote system;
send a request, to the remote system, for content;
initiate a download of the content from the remote system;
send a request, to the remote system, for a license key for the content based on information provided in a header of the content being downloaded;
receive the license key from the remote system when the remote system determines that the device is outside a blackout region of the requested content, and when the remote system determines that the device satisfies one or more criteria associated with the license key;
use the license key to decrypt the content; and
output the decrypted content to an output device,
wherein the one or more criteria include at least one of a device registration token, a maximum number of concurrent viewing sessions for the user, a maximum number of total viewing sessions for the user, and a video quality right.

20. The device of claim 19, wherein the request includes:
an Internet Protocol (IP) address of the device;
an identifier of a base station to which the device is communicatively linked to the network; or
coordinates of the device.

* * * * *